(12) United States Patent
Suzuki (10) Patent No.: US 7,650,162 B2
(45) Date of Patent: Jan. 19, 2010

(54) MOBILE TERMINAL AND WIRELESS COMMUNICATION SYSTEM

(75) Inventor: Hideya Suzuki, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 599 days.

(21) Appl. No.: 11/316,866

(22) Filed: Dec. 27, 2005

(65) Prior Publication Data

US 2006/0142017 A1    Jun. 29, 2006

(30) Foreign Application Priority Data

Dec. 27, 2004    (JP) .............................. 2004-375236

(51) Int. Cl.
*H04B 1/38*    (2006.01)
*H04M 1/00*    (2006.01)

(52) U.S. Cl. .............. 455/550.1; 455/404.2; 455/414.2; 455/437; 455/440

(58) Field of Classification Search ................. 455/434, 455/458, 464, 435.3, 456.5, 456.6, 404.2, 455/414.2, 437, 441, 450, 456.1, 456.3, 550.1
See application file for complete search history.

(56) References Cited

U.S. PATENT DOCUMENTS

2002/0014976 A1    2/2002    Yoshida
2003/0186724 A1*   10/2003   Tsutsumi et al. ............ 455/561
2005/0143082 A1*   6/2005    Yang ........................ 455/452.1

FOREIGN PATENT DOCUMENTS

EP    1204285 A1 *    5/2002

* cited by examiner

*Primary Examiner*—Tuan A Pham
(74) *Attorney, Agent, or Firm*—Crowell & Moring LLP (57) ABSTRACT

A wireless communication system for high-speed motion use, capable of shortening the frequency channel search time and increasing the communication time available for service. The system includes an access point communicating on a designated one frequency channel and a mobile terminal communicating on the same received channel by receiving radio waves transmitted by the same access point. As for mobile terminal, in a storage, priority data is stored for a channel search in which arbitrary priorities can be set respectively for the channels. Frequency channel search sequence data, set up so that the number of times of appearance becomes greater for channels for which the priority data are set higher, are generated on the basis of the relative data, and a search of communication-capable channels is carried out in accordance with the same channel search sequence data.

7 Claims, 11 Drawing Sheets

114 PRIORITY DATA

| FREQUENCY CHANNEL | PRIORITY |
|---|---|
| F1 | 12 |
| F2 | 1 |
| F3 | 1 |
| F4 | 1 |
| F5 | 1 |
| F6 | 1 |
| F7 | 1 |
| F8 | 1 |
| F9 | 1 |
| F10 | 1 |
| F11 | 1 |
| F12 | 1 |
| F13 | 1 |
| F14 | 24 |

| TIME | FREQUENCY CHANNEL |
|------|-------------------|
| 0 | F14 |
| 1 | F1 |
| 2 | F14 |
| 3 | F2 |
| 4 | F14 |
| 5 | F1 |
| 6 | F14 |
| 7 | F3 |
| 8 | F14 |
| 9 | F1 |
| 10 | F14 |
| 11 | F4 |

113 — SEARCH SEQUENCE DATA

| TIME | FREQUENCY CHANNEL |
|------|-------------------|
| 0    | F1                |
| 1    | F2                |
| 2    | F3                |
| ⋮    |                   |
| 12   | F13               |
| 13   | F14               |
| 14   | F1                |
| ⋮    |                   |

MOBILE TERMINAL AND WIRELESS COMMUNICATION SYSTEM

BACKGROUND OF THE INVENTION

1. Field of the Invention

The present invention pertains to a mobile terminal mounted in a high-speed mobile object and a wireless communication system including the same mobile terminal.

2. Description of the Related Art

At present, when accessing in real time desired information located on the Internet or the like from information terminals mounted in mobile objects like human beings, cars, and trains, it is mandatory to utilize wireless communication systems. As for wireless communications, cellular phones are generally used relative to telephone conversations and electronic mail and, further, the dissemination of the communication networks therefor has advanced across wide areas covering regions with about 90% or more of the domestic population in Japan. Consequently, cellular phones are valid with respect to movements over wide areas, and in addition, they are valid with respect to high-speed motion. Incidentally, as for cellular phones, telephone conversations while onboard a Shinkansen train are possible, i.e. they can be used even during high-speed movements at speeds of 200 km per hour or more.

Consequently, even in the case of accessing the Internet or the like from an information terminal mounted in a mobile object, the simplest method is that of utilizing a cellular phone and the communication network therefor. Even at present, Internet connection service is performed via cellular phone networks, and cellular phones themselves are in the process of becoming information terminals capable of Internet connections.

In recent years, a next-generation information provision service meant for motor vehicles and combining telecommunications and informatics, called telematics, has gradually moved into the spotlight, and more recently, commercial service has also been introduced within Japan. In these telematics services, the communication network of a cellular phone is put to practical use and in order to receive a service, it is common to pay not only a service fee to the telematics operator but also communication charges to the wireless communication operator. However, when it comes to telematics users, the culture of paying charges for the communications as well has not yet got established, so this has become one primary obstructing factor for the dissemination of telematics.

Incidentally, as a representative example of a wireless system in which it is not necessary to pay a communication charge, there is the Wireless LAN (Local Area Network). Moreover, if this Wireless LAN is used, the construction of a private wireless network is possible. That is to say that it is possible, by means of a Wireless LAN, to implement a very versatile telematics service capable of letting anybody enter anytime and without charges. However, the greatest issue in the case of applying this Wireless LAN to telematics resides in the fact that communication with a terminal on a high-speed moving object like a motor vehicle or a train is difficult because from the outset, in Wireless LAN, the speed of motion of the mobile terminal was only imagined to be at most approximately the speed of a pedestrian.

Figure 11A:
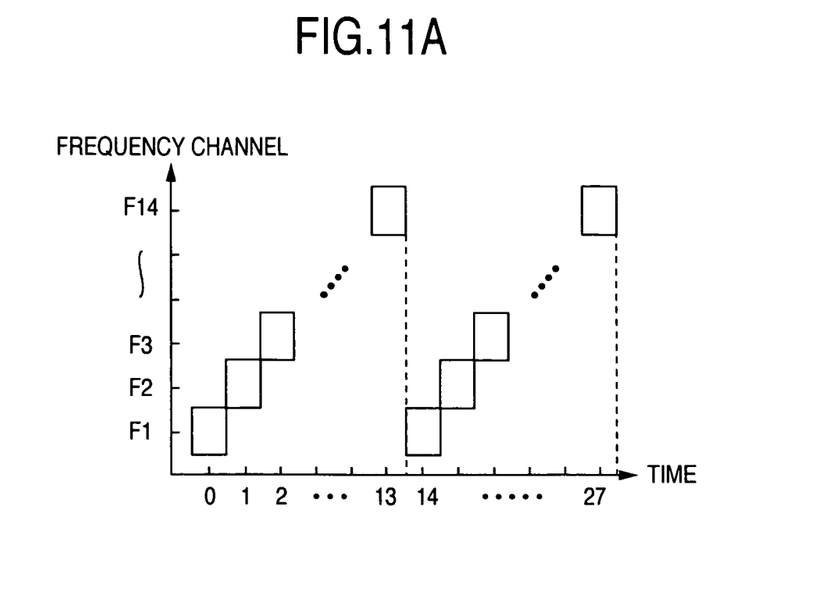
FIGS. 11A and 11B are diagrams showing a general example of a conventional frequency channel search, FIG. 11A being a diagram showing the relationship between frequency channel and time during the same frequency channel search and FIG. 11B being an example of search sequence data.
Figure 11B:
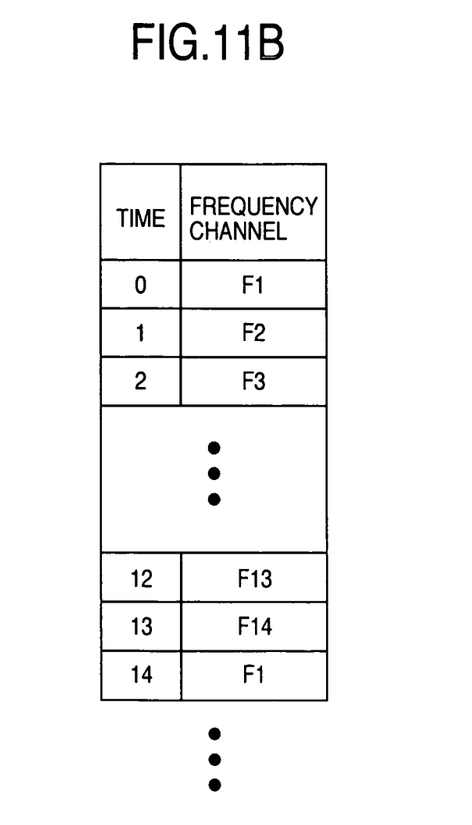

The reason why the same communication turns out to be difficult is that, in the case of Wireless LAN (IEEE 802.11 Specification), the area in which communication is possible has a range limited to at most several hundred meters, and in addition, that it is not possible to restrict the number of frequency channels used in that communication to one and that an excessive time is required for the frequency channel search for the purpose of setting up a communication link. This will be explained by FIGS. 11A and 11B. Here, FIGS. 11A and 11B are diagrams showing a general example of a conventional frequency channel search, FIG. 11A being a diagram showing the relationship between frequency channel and time during the same frequency channel search and FIG. 11B being an example of search sequence data.

If e.g. a mobile terminal mounted in a motor vehicle enters the communication area of some base station of the Wireless LAN, a frequency channel search is carried out in order to set up a communication link with that base station. As shown in FIGS. 11A and 11B, in the case where e.g. frequency channels F1 to F14 are allocated in the communication band of the Wireless LAN, the mobile terminal searches the same frequency channels by number from F1 to F14. Then, when it has been possible to confirm the frequency channel used by the base station thereof, a communication link is established and transmission and reception of data is carried out.

On the other hand, in the case it took e.g. 2 s for the search of one frequency channel, in the worst case, it turns out that a time of 28 s is required until the establishment of a communication link. In that case, since, when the mobile terminal is moving at a speed of 60 km per hour, the same mobile terminal moves 470 m in 28 s, it ends up getting out of a normal Wireless LAN area, so it has not been possible to carry out transmission and reception of data.

As against this, in JP-A-2002-57615 (Paragraph 0021 to Paragraph 0035, FIG. 1 and FIG. 2), there is disclosed a communication system designed to shorten, by increasing the frequency of occurrence of searches of a specific frequency channel allocated to a service for which it is necessary to handle high-speed motion, the frequency channel search time, i.e. the time until the establishment of a communication link, and ensure a data transmission and reception time, in the case of receiving such a service.

SUMMARY OF THE INVENTION

However, since frequency channels are fixed for each specific service in the communication system disclosed in JP-A-2002-57615(Paragraph 0021 to Paragraph 0035, FIG. 1 and FIG. 2), it cannot be applied to an open communication system such as Wireless LAN. Of course, if one ends up restricting the system to several kinds of specific services such as an automatic fee receiving system (ETC: Electronic Toll Collection), application becomes possible, but in that case, the result is that the versatility and diversity of a telematics system implemented with Wireless LAN is lost. The result is that the interest of operators in entering the market of telematics services is weakened, so a healthy development of the telematics service business cannot be expected.

Taking into consideration the problems of the prior art mentioned above, it is an object of the present invention to provide, in a communication system for telematics services using a Wireless LAN with no charges for communication, a mobile terminal and a wireless communication system including the same mobile terminal, which are capable of shortening the frequency channel search time and lengthening the time for communication.

The mobile terminal of the present invention is a mobile terminal, in a wireless communication system consisting of an access point communicating on a designated one of a plurality of frequency channels and a mobile terminal communicating with the access point on the same frequency channel by receiving radio waves transmitted by the access point, which is characterized by: comprising a storage means storing relative priority data for a frequency channel search in which arbitrary relative priorities can be set respectively for the aforementioned plurality of frequency channels; generating, on the basis of the relative priority data stored in the same storage means, frequency channel search sequence data set up so that the number of times of appearance becomes greater for frequency channels for which the relative priority data are set higher; and carrying out a search of the frequency channels with which communication is possible, following the frequency channel order of the same generated frequency channel search sequence data.

The present invention is further a wireless communication system set up to generate the aforementioned relative priority data in the access point and also in the server connected to the access point, and to provide the generated relative priority data to the mobile terminal.

Since it is possible, in the present invention, to determine, by the relative priority data, the frequency of occurrence by which frequency channels are searched, it is possible to shorten the channel search time, at the time of the establishment of a communication link, for frequency channels for which the relative priority is set high. Further, since it is possible to set arbitrarily the same relative priority data, there is no need to fix a designated frequency channel for a specific service, so the setting of versatile services and frequency channels consequently becomes possible. Also, the relative priority data can be updated by data acquired by the mobile terminal itself, relative priority data provided by the access point, relative priority data provided by the server, or the like. It turns out that, as a result, the relative priority data of the mobile terminal conform more to the actual state, making it possible to further shorten the channel search time on average.

It becomes possible to implement a mobile terminal for high-speed motion in which the channel search time up to the establishment of the communication link can be shortened and the real communication time can be lengthened, and it also becomes possible to implement a versatile wireless communication system without any communication charges.

DESCRIPTION OF THE EMBODIMENTS

Below, a detailed description of the embodiments will be given by using the drawings.

1. First Embodiment

Figure 1:
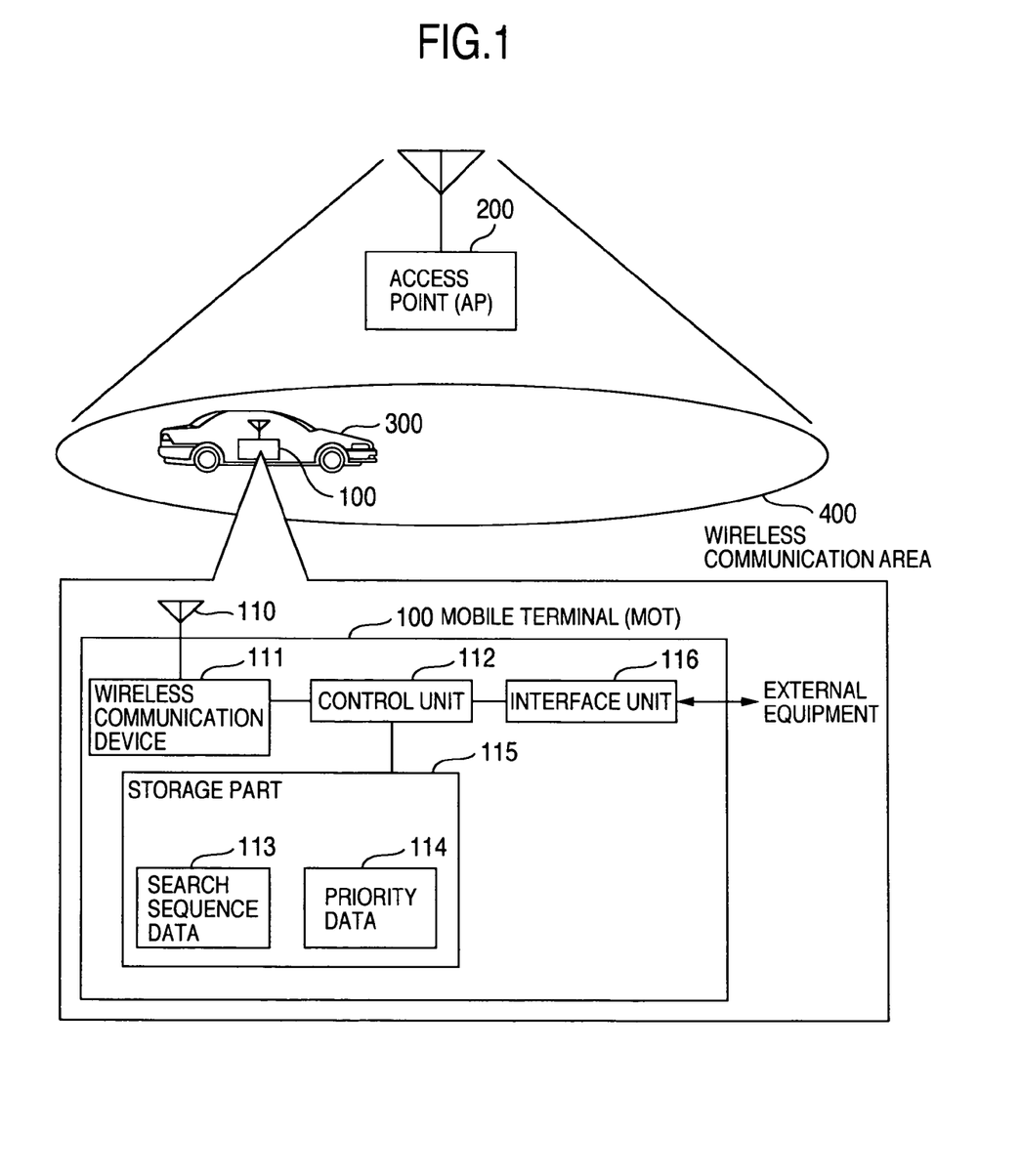
FIG. 1 is a diagram showing a wireless communication system and a mobile terminal related to the first embodiment of the present invention.
Figure 2:
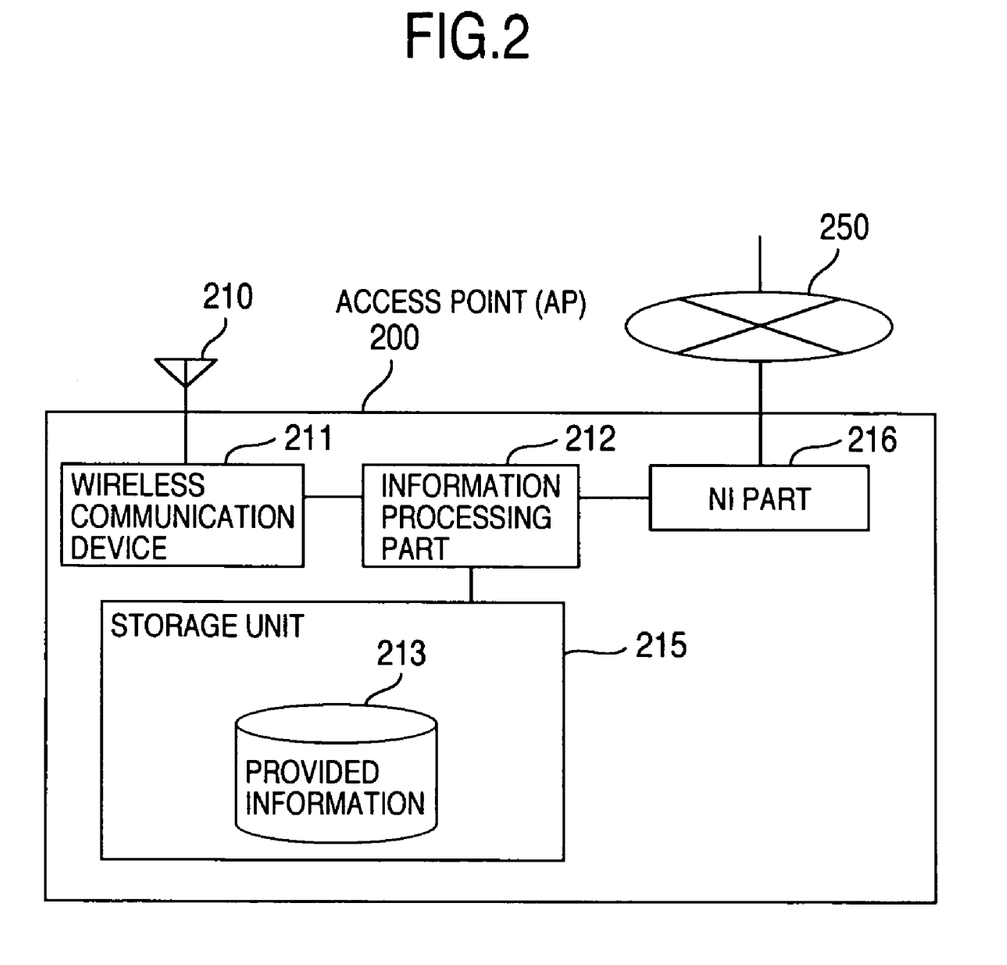
FIG. 2 is a diagram showing the configuration of an access point related to the first embodiment of the present invention.

FIG. 1 is a diagram showing the configuration of a wireless communication system and a mobile terminal related to Embodiment 1 of the present invention and FIG. 2 is a diagram showing the configuration of an access point related to Embodiment 1 of the present invention.

As shown in FIG. 1, the wireless communication system related to the present embodiment comprises a mobile terminal 100 (below abbreviated as MOT) mounted in e.g. a vehicle 300 or the like, an access point 200 (below abbreviated as AP) installed e.g. by the roadside or the like. AP 200 is a base station, based e.g. on the IEEE 802.11 Specification, the communication-enabled wireless communication area 400 of which has a range of several hundred meters with AP 200 at its center. In other words, MOT 100 installed in vehicle 300 carries out communication with AP 200 within wireless communication area 400. Here, unless there is mutual communication interference, it does not matter if, for APs 200, several are installed by e.g. the roadside.

Further, as shown in FIG. 1, MOT 100 comprises an antenna 110, a wireless communication device 111 performing transmission and reception of wireless signals, a control part or a control unit 112 controlling this wireless communication device 111, a storage part or a storage unit 115 connected to this control part 112 and storing information for the control of wireless communication device 111, and an interface part or an interface unit 116 for connecting to external equipment. Here, in storage part 115, there are stored search sequence data 113 for instruction of the frequency channel search by control part 112 to wireless communication device 111, and frequency channel relative priority data or priority data 114 forming the basis for the same search sequence data 113. Further, storage part 115 comprises a semiconductor memory, a hard disk, or the like, or a storage device where the same coexist.

Next, as shown in FIG. 2, AP 200 is constituted by including an antenna 210, a wireless communication device 211 performing transmission and reception of wireless signals, an information processing part or an information processing unit 212 performing various kinds of information processing in addition to controlling wireless communication device 211, a storage part or a storage unit 215 connected to information processing part 212 and storing information for the control of and information processing for wireless communication device 211, and a network interface part 216 (below abbreviated as "NI part") for connecting to a network 250. Here, in storage part 215, in addition to there being stored various kinds of provided information 213 supplied by AP 200 to MOT 100, there are also stored programs for implementing the functionality of AP 200. Further, storage part 215 comprises a semiconductor memory, a hard disk, or the like, or a storage device where the same coexist.

Also, network 250 and NI part or NI unit 216, in the present embodiment, are not particularly required items, but they can e.g. be used for acquiring provided information 213 from a computer or the like via network 250.

In a wireless communication system configured as mentioned above, AP 200 communicates its own information on a designated frequency channel with a designated time period. With respect to this, MOT 100 mounted in vehicle 300 does not generally know the frequency channel used by AP 200 for communication. Accordingly, MOT 100 searches, in a designated sequence, the plurality of frequency channels that can be utilized with this wireless communication system from the time before vehicle 300 enters wireless communication area 400. At this point, as frequency channel search modes, a couple of modes can be assumed.

In the first frequency channel search mode, MOT 100 progressively switches, in a designated sequence, between the plurality of frequency channels that can be utilized with the concerned wireless communication system, and when it has been able to receive the information on the identifier (ID) and so forth communicated by AP 200, it establishes a communication link with AP 200 on the frequency channel on which the same information had been received. Further, in the second frequency channel search mode, MOT 100 switches, in a designated sequence, between the plurality of frequency channels that can be utilized with the concerned wireless communication system, transmits information on identifiers and the like on each frequency channel, and establishes a communication link with AP 200 on the frequency channel on which there is a response from AP 200. In the present invention, it does not matter which of these frequency channel search modes is used.

In a frequency channel search such as this, the frequency channel is searched in a designated sequence. At this point, in case the used frequency channels of AP 200 installed by the roadside are scattered completely uniformly as in the prior art of FIG. 11, it is not possible to establish even the communication link in a MOT 100 in a high-speed moving object like vehicle 300. Accordingly, it is assumed here that an operator attempting to provide information by using AP 200 of the present embodiment is recommending, e.g. by consulting and collaborating, that the frequency channels used by AP 200 shall be chosen to be the specific two or three frequency channels. If so, the result is that the used frequency channels of AP 200 installed by the roadside concentrate on the recommended two or three frequency channels.

In a case like this, it is possible, by increasing the frequency of occurrence of the search for the two or three frequency channels to which the search is restricted, to shorten the frequency channel search and, as a result, the time up to the establishment of a communication link can be shortened.

Accordingly, in the present embodiment, when MOT 100 performs a frequency channel search, the system is prepared so as to be able to designate the frequency channels for which a search is performed with priority. Because of that, MOT 100 saves relative priority data 114 in storage part 115 thereof.

Figure 3:
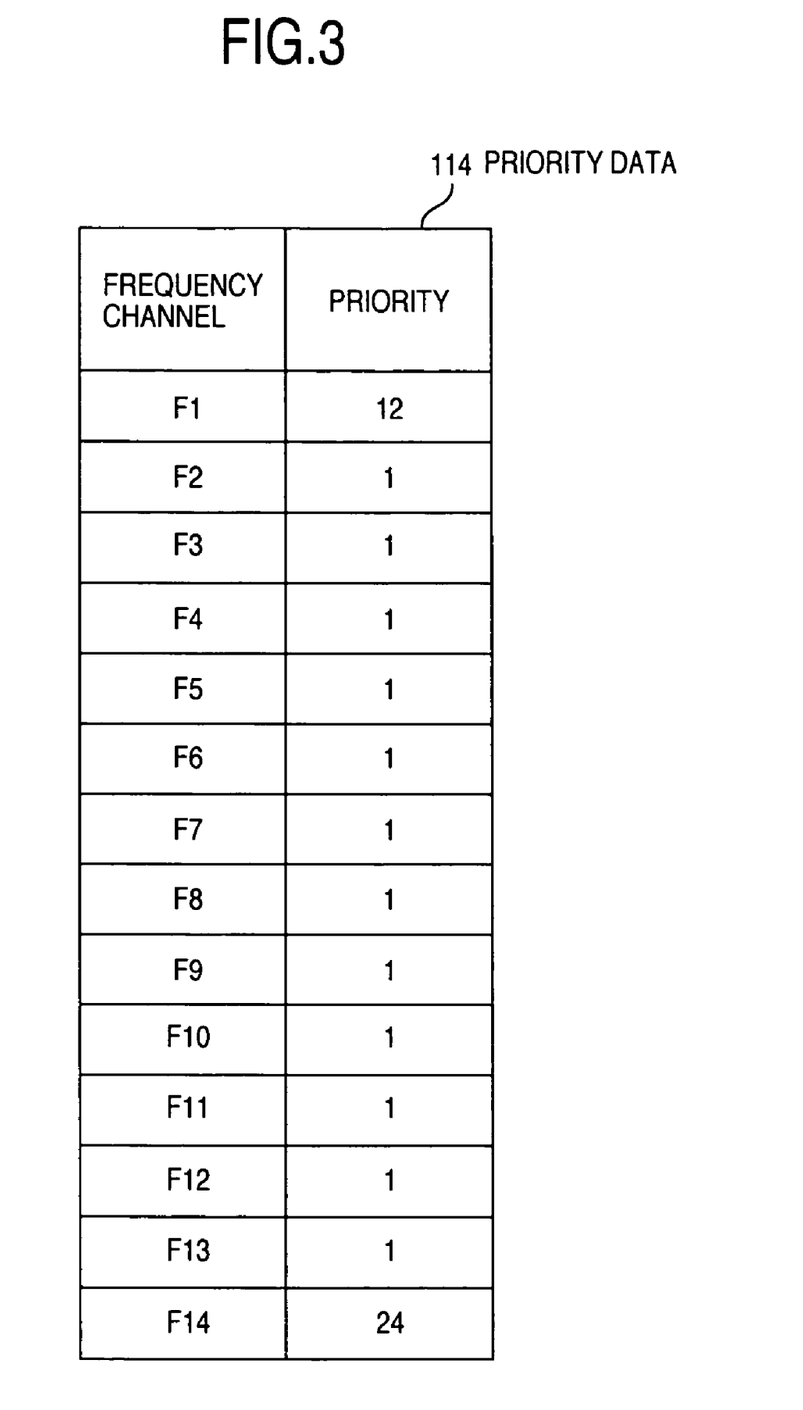
FIG. 3 is a diagram showing an example of frequency channel relative priority data held in the wireless mobile terminal related to an embodiment of the present invention.

FIG. 3 is a diagram showing an example of relative priority data for frequency channel searches held in a mobile terminal related to an embodiment of the present invention. As shown in relative priority data 114 of FIG. 3, the frequency channels which can be utilized with the wireless communication system in the present embodiment are channels F1 to F14, a relative priority being set for each channel. In the case of this example, the relative priority is expressed with the frequency of occurrence itself; e.g. F14 is searched with a frequency of occurrence of 24 times out of 48, i.e. with a frequency of occurrence of one time out of two, F1 is searched with a frequency of occurrence of 12 times out of 48, i.e. with a frequency of occurrence of one time out of four, and the other channels are searched with a frequency of occurrence of one time out of 48. Further, the relative priority data may be data where the frequencies of occurrence are expressed as probabilities or may be numbers expressing a mere priority ranking.

Figure 4A:
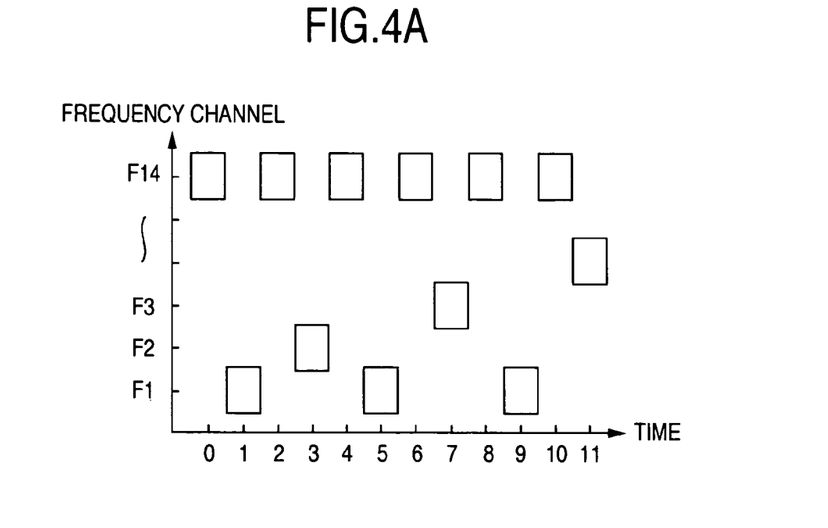
FIGS. 4A and 4B are diagrams showing an example of performing a frequency channel search on the basis of the relative priority data of FIG. 3, FIG. 4A being a diagram showing the relationship between frequency channel and time during the same frequency channel search and FIG. 4B being an example of search sequence data.
Figure 4B:
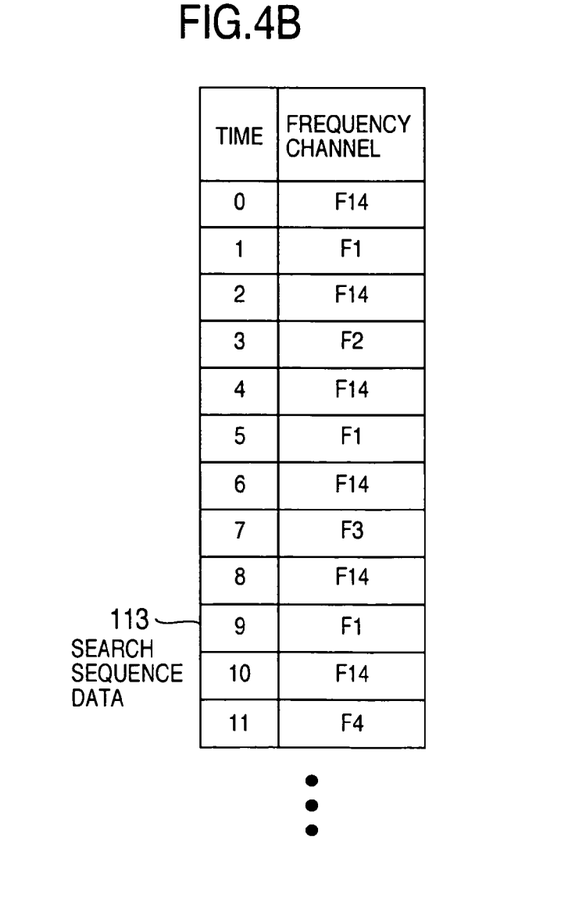

FIGS. 4A and 4B are diagrams showing an example of performing a frequency channel search on the basis of the relative priority data of FIG. 3, FIG. 4A being a diagram showing the relationship between frequency channel and time during the same frequency channel search and FIG. 4B being an example of search sequence data. As shown in FIG. 4A, it is seen that F14 is searched with a frequency of occurrence of one time out of two, and that F1 is searched with a frequency of occurrence of one time out of four. Consequently, in case the frequency channel of AP 200 is F14, it is possible to establish a communication link in 4 s in the worst case, even if one channel search takes 2 s. In the present embodiment, control part 112 of MOT 100 generates, on the basis of relative priority data 114 (refer to FIG. 3), search sequence data 113 (refer to FIG. 4B), and performs a frequency channel search by controlling wireless communication device 111 in accordance with the frequency channel data of the generated search sequence data 113.

As mentioned above, in the present embodiment, relative priority data for frequency channel searches regarding each respective frequency channel are held in the relative priority data 114 subpart of storage part 115 of MOT 100 and, on the basis of the same relative priority data 114, a frequency channel search is performed. For that reason, in case the frequency channel used by AP 200 is a frequency channel with high relative priority, it is possible to shorten the time required for the establishment of a communication link.

Further, regarding the data on relative priorities stored in relative priority data 114, the system may be set up so as to connect interface part 116 of MOT 100 to a dedicated write device etc. and write data adapted to the actual AP 200 state of use of frequency channels at that time, e.g. at the time of manufacturing MOT 100, or when the user purchases MOT 100, or in the factory, a store, or the like.

Even once the data on relative priorities stored in relative priority data 114 have been written, with the lapse of time, there is a possibility of not matching with the actual state. This is because there is a possibility that AP 200 is subject to actions like being set anew, being dispensed with, and having its frequency channels updated. Accordingly, in the present embodiment, MOT 100 operates, when performing communication with AP 200, so as to update the contents of relative priority data 114 on the basis of the frequency channels at that time.

There are various ways of carrying out the same update, but if e.g. communication with AP 200 is monitored by means of control part 112 of MOT 100 and communication on the same frequency channel continues for a designated number of times, the update can be set up to raise the relative priority of that frequency channel in relative priority data 114. Also, the update may be carried out by acquiring, by control part 112, the statistics of frequency channels used a designated number of times in communication with AP 200 and, on the basis of the results thereof, generating anew relative priority data 114.

Further, the update may be carried out by having the data in relative priority data 114 transmitted from a MOT 100 mounted in another vehicle 300 running in parallel or passing and, on the basis of the transmitted data of relative priority data 114, updating its own relative priority data 114. In this update, relative priority data 114 may be updated by taking the average of two sets of relative priority data in the case where the relative priority data are expressed as frequencies of occurrence or probabilities. Further, in this case, in accordance with the designated communication mode of Wireless LAN, communication is carried out between mobile terminals MOT 100.

Also, in addition, relative priority data 114 of MOT 100 can be updated on the basis of relative priority data generated by AP 200. In this case, AP 200 receives, on the occasion of communication with MOT 100, the data of relative priority data 114 transmitted by MOT 100 and collects the same received data on relative priorities for a plurality of MOT 100. Then, on the basis of the same collected data, new relative priority data are generated. In the generation of new relative priority data, the access point may e.g. operate so as to add more weight to the frequency channel information it is using itself or it may average the collected relative priority data. Then, AP 200 transmits the same generated new relative priority data to MOT 100. MOT 100 receives the new relative priority data and updates its own relative priority data 114 by means of the same new relative priority data.

As mentioned above, by progressively updating appropriately relative priority data 114, it is possible to convert relative priority data 114 into data matching the installed condition of AP 200 or the actual state of use of the frequency channels in the same AP 200. As a result, it is possible, on average, to shorten the frequency channel search time and to shorten the time required to establish the communication link.

2. Second Embodiment

Figure 5:
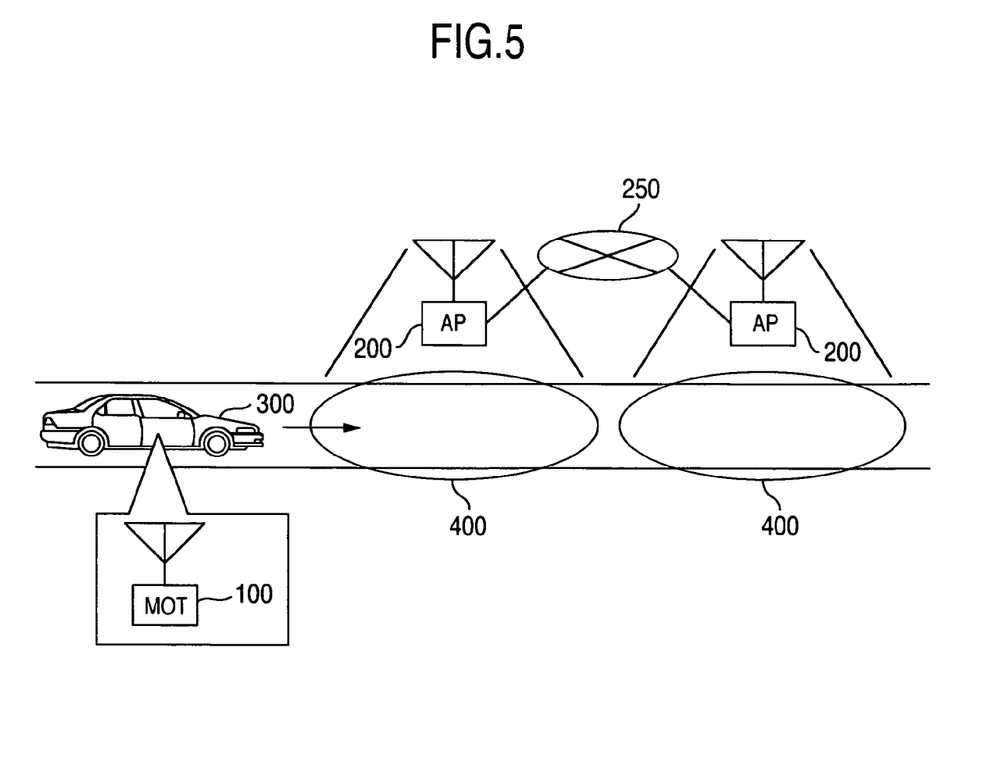
FIG. 5 is a diagram showing the configuration of a wireless communication system related to the second embodiment of the present invention.

FIG. 5 is a diagram showing the configuration of a wireless communication system related to Embodiment 2 of the present invention. As shown in FIG. 5, in Embodiment 2, mutually neighboring APs 200 are connected by means of network 250. Here, the configuration of MOT 100 and AP 200 is the same as that explained in FIG. 1 and FIG. 2.

In the case where, as in the present embodiment, a plurality of neighboring AP 200 are connected by means of network 250, it is possible for an AP 200 to acquire from another, neighboring AP 200 information on frequency channels used by that AP 200 in communication with MOT 100. Accordingly, AP 200 acquires the same frequency channel information from the other, neighboring AP 200 and generates relative priority data, based on the acquired frequency channel information and its own frequency channel information. Next, the same relative priority data are transmitted to MOT 100. MOT 100 receives the same relative priority data and, based on the same relative priority data, updates its own relative priority data 114.

Proceeding in this way, relative priority data dedicated to the neighbor area in which the AP 200 connected by means of network 250 is located are set to relative priority data 114 of MOT 100. Consequently, the same relative priority data 114 are only good in a small area, but the result is that in that small area, the data are optimal. As shown in FIG. 5, if a vehicle transits a certain AP 200 and receives from that AP 200 relative priority data dedicated to a neighbor area, it is possible, since there is an extremely high probability that the subsequently transited AP 200 is also attached to that neighbor area, to shorten the frequency channel search time and to shorten the time needed to establish a communication link, by means of the received relative priority data.

3. Third Embodiment

Figure 6:
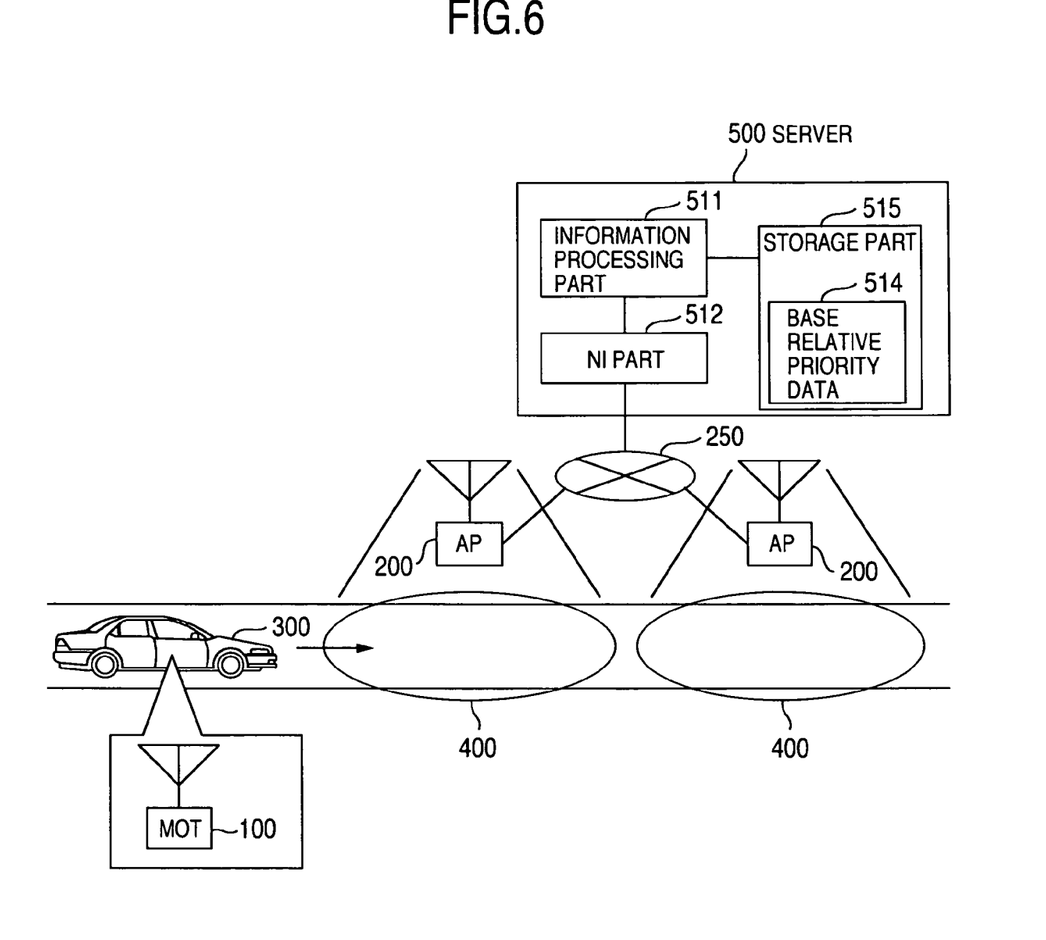
FIG. 6 is a diagram showing the configuration of a wireless communication system related to the third embodiment of the present invention.

FIG. 6 is a diagram showing the configuration of a wireless communication system related to Embodiment 3 of the present invention. As shown in FIG. 6, Embodiment 3 is a mode which, as a system configuration, has a server 500 further connected to network 250 in Embodiment 2. Here, the configuration of MOT 100 and AP 200 is the same as that explained with FIG. 1 and FIG. 2.

Server 500 is constituted, as shown in FIG. 6, by including an information processing part or an information processing unit 511, a network interface part 512 (below abbreviated as "NI part") connected to network 250, and a storage part or a storage unit 515 connected to information processing part 511 and storing base relative priority data 514 and so forth. Further, storage part 515 comprises a semiconductor memory, a hard disk, or the like, or a storage device where the same coexist.

In the present embodiment, server 500 collects, from an AP 200 connected to network 250, frequency channel information used by that AP 200 for communication and accumulates it as base relative priority data 514. Base relative priority data 514 may have the same configuration as the relative priority data shown e.g. in FIG. 3. In this case, the relative priority can be taken to be the number of AP 200 using the concerned frequency channel. Server 500 updates base relative priority data 514 periodically, or in case there is an addition/change of AP 200.

Proceeding in this way, the generated base relative priority data 514 are transmitted via network 250 to AP 200 and stored in storage part 215 of 1P 200. Next, AP 200 transmits the same base relative priority data to MOT 100 when performing communication between itself and MOT 100. MOT 100 receives the same base relative priority data 514 and updates its own relative priority data 114 (refer to FIG. 1) with the same received base relative priority data 514.

By proceeding in this way, the result is that relative priority data 114 of MOT 100 are updated on the basis of base relative priority data 514 generated in server 500. Since base relative priority data 514 are data which reflect information on the frequency channels actually used by AP 200, the result is that relative priority data 114 are also data conforming to the actual state. Consequently, by the use by MOT 100 of relative priority data 114 conforming to the actual state, it is possible to shorten the frequency channel search time and to shorten the time needed to establish a communication link.

4. Fourth Embodiment

Figure 7:
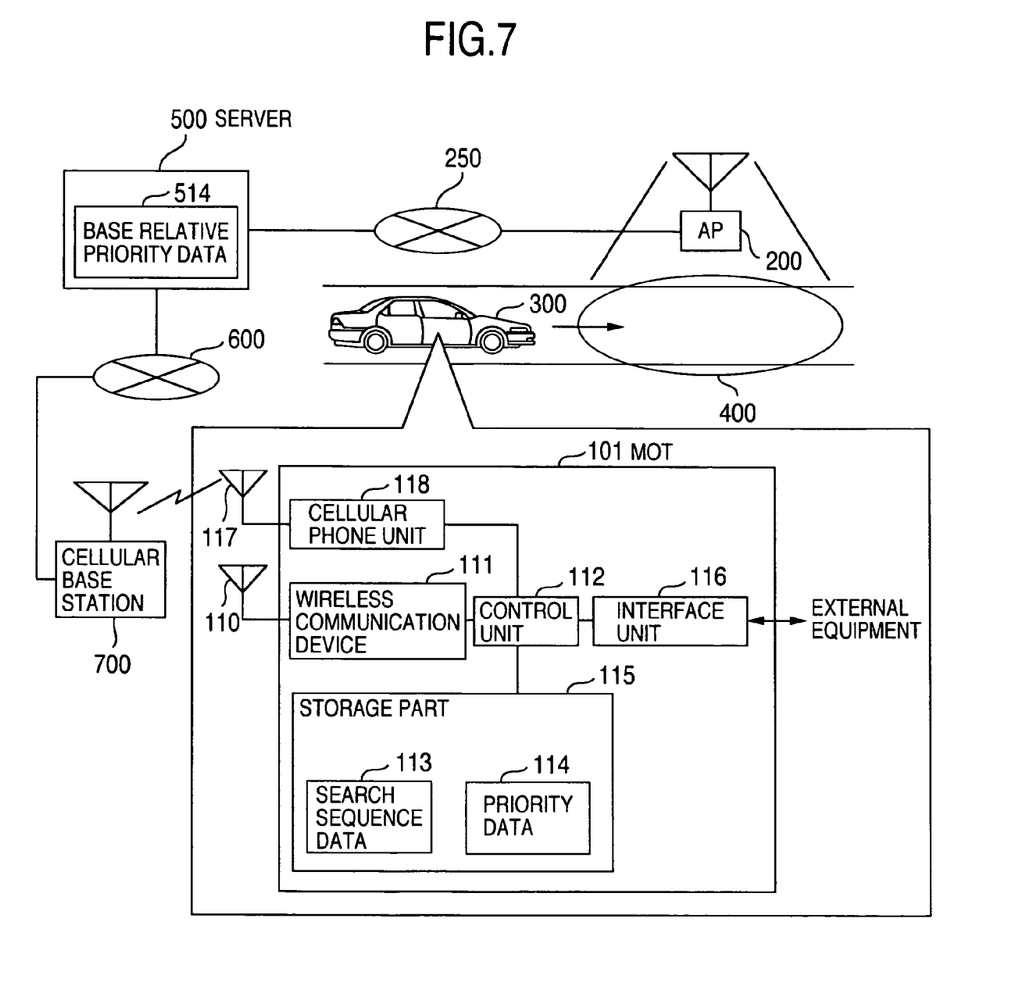
FIG. 7 is a diagram showing the configuration of a wireless communication system and a mobile terminal related to the fourth embodiment of the present invention.

FIG. 7 is a diagram showing the configuration of a wireless communication system and a mobile terminal related to Embodiment 4 of the present invention. The present embodiment is a mode in which there has been added a modification so as to transmit base relative priority data 514 in Embodiment 3 (refer to FIG. 6) from server 500 to MOT 101 via a cellular phone network. Consequently, as shown in FIG. 7, for MOT 101, there is added, to the MOT 100 considered up to Embodiment 3, a cellular phone unit 118 connected to control part 112 and an antenna 117 therefor. Also, even for the whole wireless communication system, server 500 is connected to a cellular base station 700 via a network 600, there being added a configuration in which cellular base station 700 communicates with cellular phone unit 118 of MOT 101.

In the present embodiment, server 500 generates base relative priority data 514 in the same way as in Embodiment 3. Next, the same generated base relative priority data 514 are transmitted to MOT 101 via network 600 and cellular base station 700. MOT 101 receives the same base relative priority data via cellular phone unit 118 and updates its own relative priority data 114 with the same received base relative priority data.

By proceeding in this way, it becomes possible to transmit base relative priority data 514 to MOT 101, without imposing a burden on the communications of the Wireless LAN of the present invention which has as an object information provision and the like from AP 200. Further, in this case, the transmission of base relative priority data 514 may be performed only when base relative priority data 514 are updated.

Further, in the present embodiment, base relative priority data 514 have been transmitted to MOT 101 by means of cellular base station 700 and cellular phone unit 118, but in substitution for cellular base station 700 and cellular phone unit 118, a broadcast station and a broadcast receiver may be chosen, or a base station and a mobile terminal of a separate-type wireless LAN may be chosen.

5. Fifth Embodiment

Figure 8:
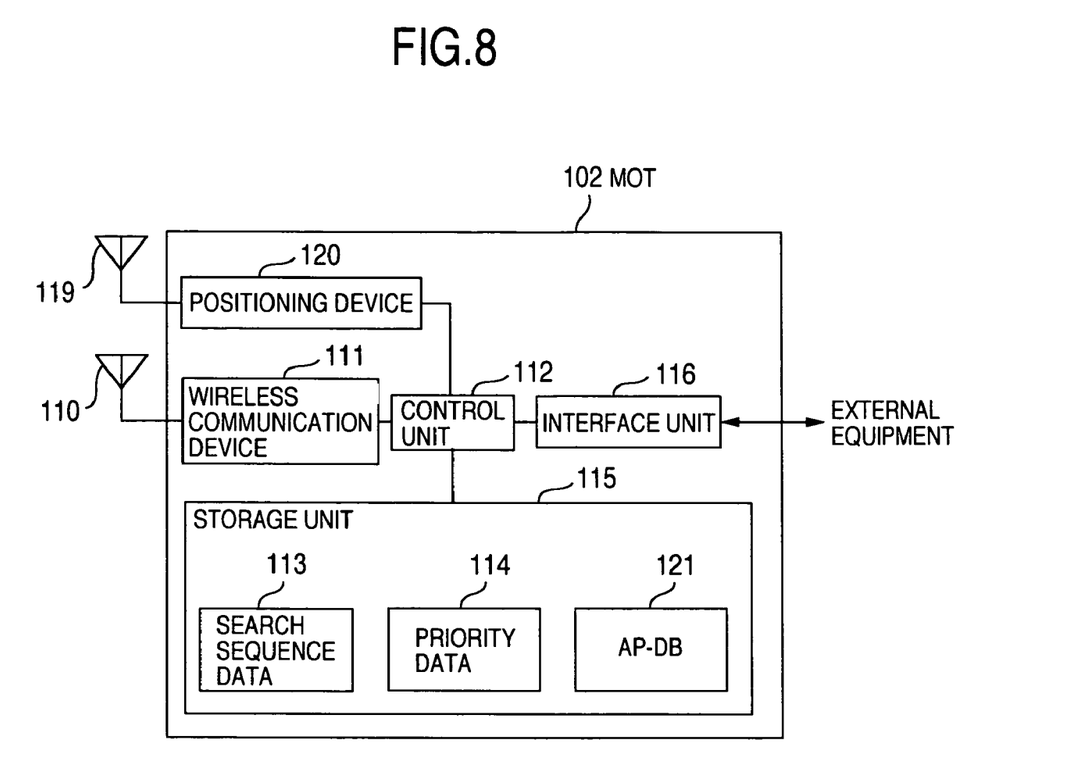
FIG. 8 is a diagram showing the configuration of a wireless communication system related to the fifth embodiment of the present invention.

FIG. 8 is a diagram showing the configuration of a wireless communication system related to Embodiment 5 of the present invention. As shown in FIG. 8, for a MOT 102 in the present embodiment, there is added to MOT 100 of Embodiment 1 a positioning device 120 connected to control part 112 and an antenna 119 therefor and there is also provided, in storage part 115 thereof, an access point data base 121 (below abbreviated as AP-DB) in which there is stored positioning information therefor and information on used frequency channels for an AP 200 installed by the roadside. Here, positioning device 120 is chosen to be a device based on GPS (Global Positioning System), but it does not matter if the device is one based on another positioning method.

In the present embodiment, MOT 102 can at any time acquire its own position of location by means of positioning device 120. Accordingly, MOT 102 consults AP-DB 121, on the basis of the position of the location acquired by means of positioning device 120, and extracts the used frequency channels of the nearest AP 200. Next, based on the extracted used frequency channels of the nearest AP 200, relative priority data 114 are updated. Specifically, in relative priority data 114, the setting is carried out so as make the relative priorities of the used frequency channels of the nearest AP 200 high.

By proceeding in this way, since it is possible to generate relative priority data 114 wherein the relative priorities of the used frequency channels of the AP 200 which is next to be transited by MOT 102 have been made high with certainty, it is possible, by using the same relative priority data 114, to more surely shorten the frequency channel search time and to shorten the time needed to establish a communication link.

Further, MOT 102 extracts the position of the location acquired by positioning device 120 and the distance to the nearest AP 200, and in case the extracted distance is equal to or greater than a prescribed distance, it is acceptable to set up the terminal, until the same distance goes below the prescribed distance, so as to halt the operation of wireless communication device 111 of MOT 102, i.e. to block the power supply thereof. By proceeding in this way, it is possible to provide for the attainment of electric power savings in MOT 102.

Further, regarding the data of AP-DB 121, the system may be set up so as to connect interface part 116 of MOT 102 to a dedicated write device etc. and write data adapted to the actual AP 200 state of use of frequency channels at that time, e.g. at the time of manufacturing MOT 102, or when the user purchases MOT 102, or in the factory, a store, or the like. Further, after purchase of MOT 102, the system may be set up so as to connect interface part 116 of MOT 102 to a dedicated write device etc. and update the data of AP-DB 121.

6. Sixth Embodiment

Figure 9:
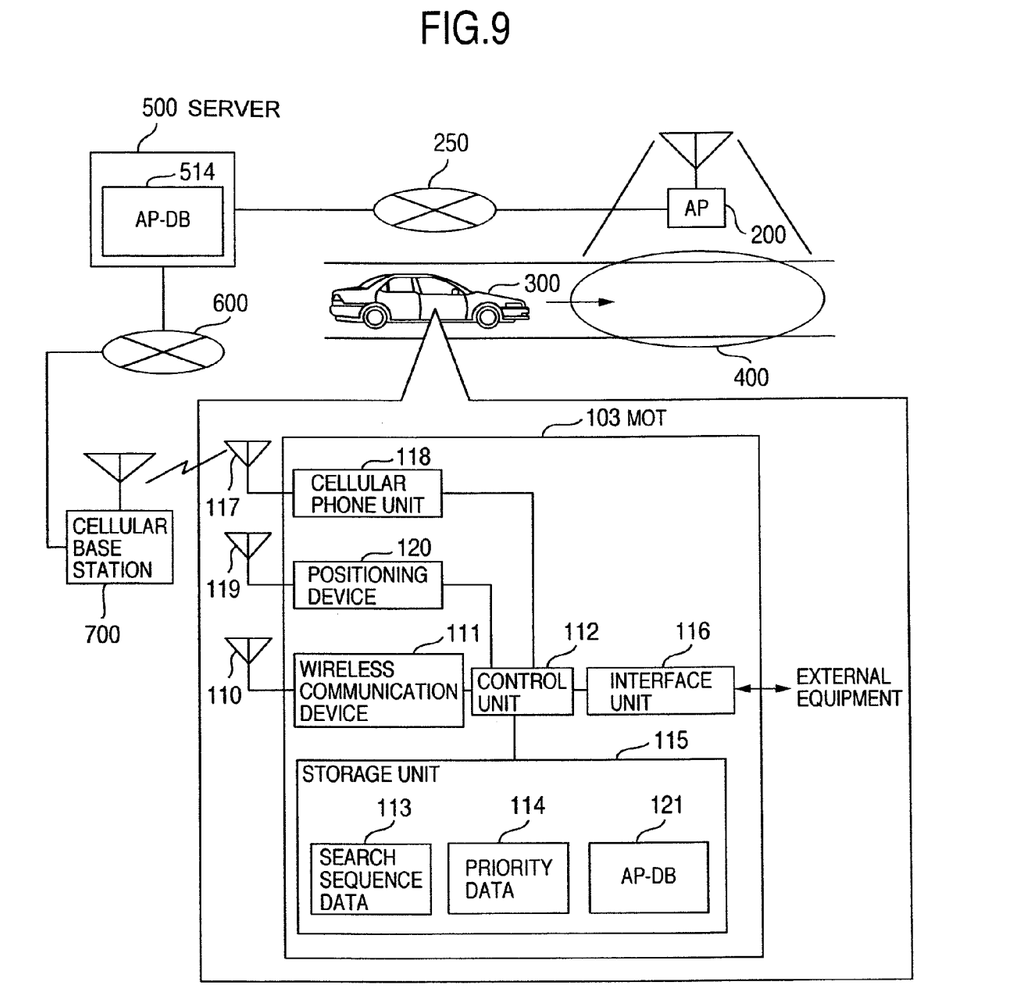
FIG. 9 is a diagram showing the configuration of a wireless communication system and a mobile terminal related to the sixth embodiment of the present invention.

FIG. 9 is a diagram showing the configuration of a wireless communication system and a mobile terminal related to Embodiment 6 of the present invention. The configuration of the present embodiment is one which merges the configuration of Embodiment 4 and the configuration of Embodiment 5. In addition to cellular phone unit 118 and antenna 117 therefor, MOT 103 is also provided with a positioning device 120 and an antenna 119 therefor. Also, server 500 is connected to cellular base station 700 via network 600.

In the present embodiment, a basic access point data base 521 (below abbreviated as AP-DB) is generated and held in server 500. Here, AP-DB 521 is constituted by including, for each AP 200 connected to network 250, identity information (ID), installed position information, and used frequency channels thereof.

Server 500 collects, from AP 200 connected to network 250 via network 250, information on the frequency channels used for communication by the same AP 200 and accumulates that information in AP-DB 521. Server 500 updates AP-DB 521 periodically or in case there is an addition to or a change in AP 200.

Proceeding in this way, the generated AP-DB 521 data are transmitted to MOT 103, MOT 103 receiving the same AP-DB 521 data and updating its own AP-DB 121 with the same data. In the present embodiment, there are two paths for transmitting AP-DB 521 data to MOT 103.

First, the transfer operation for AP-DB 521 data in the case of the first path will be explained. Server 500 transmits the AP-DB 521 data to AP 200 via network 250. Next, AP 200 receives these, and stores them in storage part 215 of AP 200. Moreover, AP 200 carries out communication with a MOT 103 having entered the wireless communication area 400 thereof and transmits the same AP-DB 521 data to MOT 103. MOT 103 receives the same AP-DB 521 data and updates its own AP-DB 121 with the same received AP-DB 521 data.

Further, in this case, there is no need to provide MOT 103 with a cellular phone unit 118 and an antenna therefor. Also, when AP-DB 521 data are transmitted from server 500 to AP 200, it is acceptable, rather than transmitting all of the same data, to set up the system so as to extract, from among the data of AP-DB 521, only the data for the neighboring APs 200, including the concerned AP 200. If one proceeds in this way, it is possible to reduce the transmitted data volume.

Next, the transfer operation for AP-DB 521 data in the case of the second path will be explained. In this case, server 500 transmits the AP-DB 521 data to MOT 103 via network 600 and cellular base station 700. MOT 103 receives the data via cellular phone unit 118 and updates its own AP-DB 121 with the received AP-DB 521 data.

Further, AP-DB 521 data have here been transmitted to MOT 103 by means of cellular base station 700 and cellular phone unit 118, but in substitution for cellular base station 700 and cellular phone unit 118, a broadcast station and a broadcast receiver may be chosen, or a separate-type Wireless LAN base station and wireless communication device may be chosen.

The present embodiment brings the same effect as Embodiment 5 but since, in addition, the contents of AP-DB 121 held by MOT 103 can always be left in the most recent state, relative priority data 114 become data with better accuracy.

7. Seventh Embodiment

Figure 10:
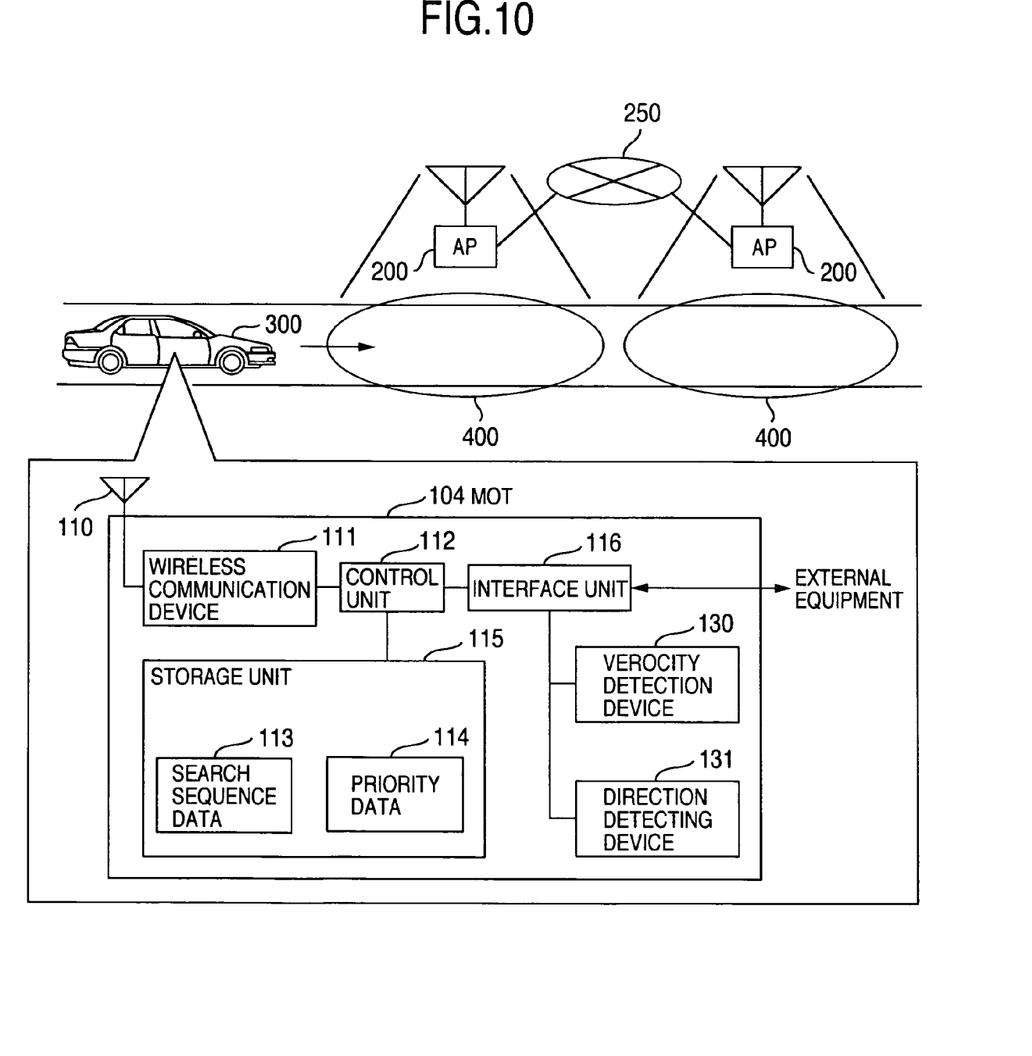
FIG. 10 is a diagram showing the configuration of a wireless communication system and a mobile terminal related to the seventh embodiment of the present invention.

FIG. 10 is a diagram showing the configuration of a wireless communication system and a mobile terminal related to Embodiment 7 of the present invention. A MOT 104 in the present embodiment is a terminal with a velocity detection device 130 and a direction detecting device 131 added to MOT 100 of Embodiment 2. Also, in the same way as for the case of Embodiment 2, AP 200 is connected to a neighboring, other AP 200 via network 250, collects frequency channel information used by the same neighboring, other AP 200 and installed position information for the same AP 200, and stores the same pieces of information, merged with its own information, in storage part 215 (refer to FIG. 2).

In that case, if MOT 104 computes the position of the location of MOT 104 on the basis of AP 200 identity information obtained when communicating with a certain AP 200, the MOT 104 motion velocity obtained from velocity detection device 130, and MOT 104 motion direction information obtained from direction detecting device 131, it is possible to accurately predict which AP 200 wireless communication area it will enter next. Accordingly, MOT 104 updates relative priority data 114 based on the frequency channels used by the predicted AP 200.

By proceeding in this way, MOT 104 can, since it can generate relative priority data 114 in which the relative priorities of the used frequency channels of the AP 200 which is next to be transited have been made high with certainty, more surely shorten the frequency channel search time and shorten the time needed to establish a communication link, by using the same relative priority data 114.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile terminal for a wireless communication system including an access point communicating on a designated one of a plurality of frequency channels, wherein the mobile terminal communicates with said access point on the same received frequency channel by receiving radio waves transmitted by said access point and comprises:

storage means storing relative priority data for a frequency channel search which is set respectively for said plurality of frequency channels, the mobile terminal generating, on the basis of the relative priority data stored in said storage means, frequency channel search sequence data set up so that the number of times of appearance becomes greater for frequency channels for which the relative priority data are set higher, the mobile terminal carrying out a search of the frequency channels with which communication is possible, following the frequency channel order of the same generated frequency channel search sequence data; and a positioning device acquiring information on its own position and an access point database consisting of position information on the position at which said access point is installed, searching said access point database on the basis of current position information obtained by means of said positioning device, obtaining the access point which is next to communicate and the frequency channels thereof, and updating said relative priority data on the basis of the obtained frequency channel information.

2. A mobile terminal according to claim 1 which, when carrying out communication with said access point, receives said access point database transmitted from said access point and updates its own stored access point database on the basis of said received access point database.

3. A mobile terminal according to claim 1, further comprising a second wireless communication means based on a communication method which is different from the communication method of the communication carried out with said access point; being connected to a server via said communication means; receiving said access point database transmitted from said server via said communication means; and updating its own stored access point database on the basis of said received access point database.

4. A wireless communication system, including an access point communicating on a designated one of a plurality of frequency channels and a mobile terminal communicating with said access point on the same frequency channel by receiving radio waves transmitted by said access point, said mobile terminal having storage means storing relative priority data for a frequency channel search in which arbitrary relative priorities can be set respectively for said plurality of frequency channels; receives other relative priority data transmitted from said access point, updates said relative priority data on the basis of said received other relative priority data; generates, on the basis of said relative priority data, frequency channel search sequence data set up so that the number of times of appearance becomes greater for frequency channels for which the relative priority data are set higher; and carries out a search of the frequency channels with which communication is possible, following the frequency channel order of the same generated frequency channel search sequence data;

wherein said access point receives the relative priority data of said mobile terminal, transmitted by said mobile terminal, generates new relative priority data on the basis of said received relative priority data and information on the frequency channel used when it is communicating itself, and transmits said generated new relative priority data to said mobile terminal; and said mobile terminal receives said new relative priority data transmitted by said access point and updates its own relative priority data on the basis of said received new relative priority data.

5. A wireless communication system, including an access point communicating on a designated one of a plurality of frequency channels and a mobile terminal communicating with said access point on the same frequency channel by receiving radio waves transmitted by said access point, said mobile terminal having storage means storing relative priority data for a frequency channel search in which arbitrary relative priorities can be set respectively for said plurality of frequency channels; receives other relative priority data transmitted from said access point, updates said relative priority data on the basis of said received other relative priority data; generates, on the basis of said relative priority data, frequency channel search sequence data set up so that the number of times of appearance becomes greater for frequency channels for which the relative priority data are set higher; and carries out a search of the frequency channels with which communication is possible, following the frequency channel order of the same generated frequency channel search sequence data;

wherein said access point is mutually connected with a neighboring access point by a network, acquires frequency channel information, from said neighboring access point, at the time of communication by said neighboring access point, generates relative priority data on the basis of the acquired frequency channel information and information on the frequency channel used when it is communicating itself, and transmits the generated relative priority data to said mobile terminal; and said mobile terminal receives said relative priority data transmitted by said access point and updates its own relative priority data on the basis of said received relative priority data.

6. A wireless communication system, including an access point communicating on a designated one of a plurality of frequency channels and a mobile terminal communicating with said access point on the same frequency channel by receiving radio waves transmitted by said access point, said mobile terminal having storage means storing relative priority data for a frequency channel search in which arbitrary relative priorities can be set respectively for said plurality of frequency channels; receives other relative priority data transmitted from said access point, updates said relative priority data on the basis of said received other relative priority data; generates, on the basis of said relative priority data, frequency channel search sequence data set up so that the number of times of appearance becomes greater for frequency channels for which the relative priority data are set higher; and carries out a search of the frequency channels with which communication is possible, following the frequency channel order of the same generated frequency channel search sequence data;

wherein said mobile terminal further comprises a means detecting the velocity of motion and the direction of motion of the mobile object in which the terminal is itself mounted; said access point is mutually connected with a neighboring access point by a network, acquires, from said neighboring access point via said network, frequency channel information at the time of communication by said neighboring access point and position information on where the same access point is located, transmits said acquired neighboring access point frequency channel information and position information to said mobile terminal; and said mobile terminal receives said neighboring access point frequency channel information and position information transmitted by said access point, and updates its own relative priority data, on the basis of the velocity of motion and the direction of motion detected by a means detecting the velocity of motion and the direction of motion of said mobile object.

7. The mobile terminal for a wireless communication system including an access point communicating on a designated one of a plurality of frequency channels, wherein the mobile terminal communicates with said access point on the same received frequency channel by receiving radio waves transmitted by said access point, the mobile terminal comprising:

a storage part storing relative priority data for a frequency channel search which is set respectively for said plurality of frequency channels;

wherein the mobile terminal generates, on the basis of the relative priority data stored in said storage part, frequency channel search sequence data set up so as to search for each of the plurality of frequency channels in a predetermined manner based on the relative priority data;

wherein the mobile terminal carries out a search of the frequency channels with which communication is possible, following the frequency channel order of the same generated frequency channel search sequence data; and wherein the predetermined manner shows that a first frequency is searched with a frequency of occurrence of 24 times out of 48 times, a second frequency is searched with a frequency of occurrence of 12 times out of 48 times, and each of the other frequencies is searched with a frequency of occurrence of one time out of 48 times.

* * * * *

UNITED STATES PATENT AND TRADEMARK OFFICE
CERTIFICATE OF CORRECTION

PATENT NO. : 7,650,162 B2
APPLICATION NO. : 11/316866
DATED : January 19, 2010
INVENTOR(S) : Hideya Suzuki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Twenty-eighth Day of December, 2010

David J. Kappos
*Director of the United States Patent and Trademark Office*